United States Patent [19]

Swinny

[11] 4,151,505
[45] Apr. 24, 1979

[54] BUZZER WARNING CIRCUIT FOR AUTOMOBILE LIGHTS

[76] Inventor: Jerry E. Swinny, 6 Little Creek Estates, R.D. 1, Little Creek Dr., Rochester, Pa. 15074

[21] Appl. No.: 902,070

[22] Filed: May 2, 1978

Related U.S. Application Data

[63] Continuation of Ser. No. 732,312, Oct. 14, 1976, abandoned.

[51] Int. Cl.² .............................................. H02J 1/00
[52] U.S. Cl. .............................. 340/52 D; 307/10 BP; 307/10 LS
[58] Field of Search ......................... 340/52 R, 52 D; 307/10 BP, 10 LS

[56] References Cited

U.S. PATENT DOCUMENTS 3,467,831  9/1969  Wilson et al. ........................ 307/10

Primary Examiner—Alvin H. Waring
Attorney, Agent, or Firm—Buell, Blenko & Ziesenheim

[57] ABSTRACT

This warning circuit consists primarily of a relay wired into the ignition switch of an automobile, the wiring being such, that when the ignition switch is turned off, relay contacts close, and causes a buzzer to be activated.

2 Claims, 1 Drawing Figure

DOUBLE-POLE, DOUBLE-THROW SWITCH

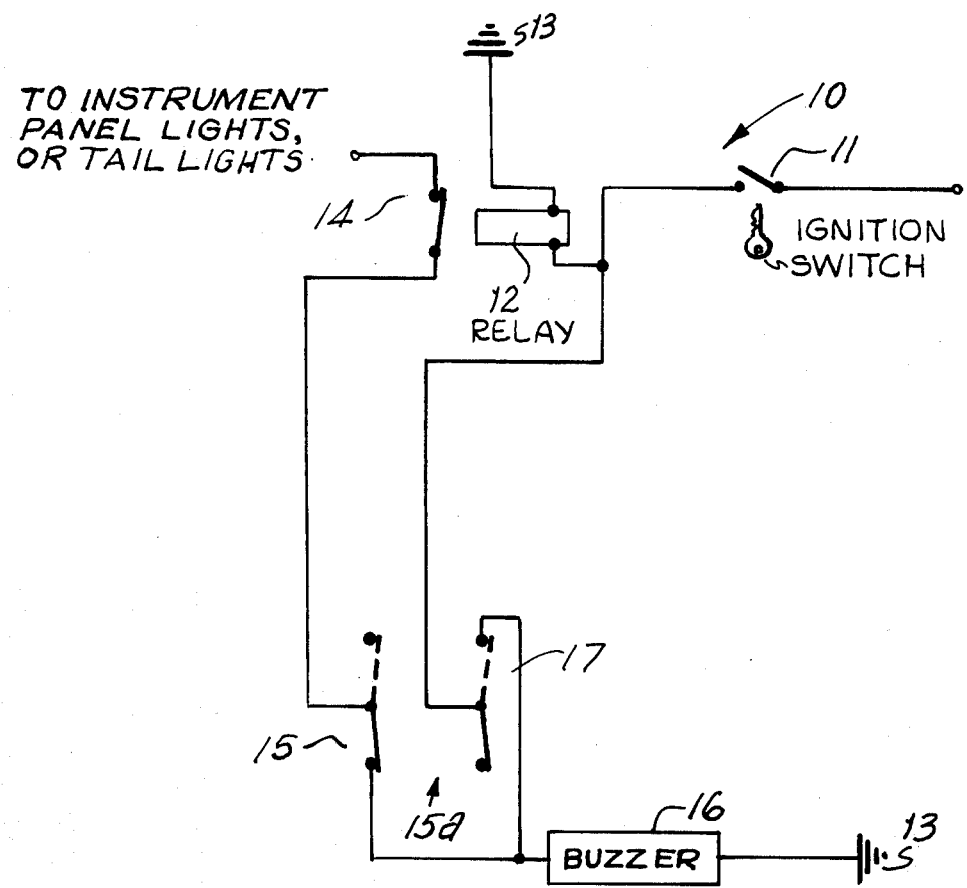
DOUBLE-POLE, DOUBLE-THROW SWITCH

BUZZER WARNING CIRCUIT FOR AUTOMOBILE LIGHTS

This application is a continuation of my copending application Ser. No. 732,312, filed Oct. 14, 1976 now abandoned.

This invention relates to automotive electrical circuits, and, more particularly, to a buzzer warning circuit for automobile lights.

It is therefore the principal object of this invention to provide a buzzer warning circuit for automobile lights, which, if the lights are on when the ignition switch is turned off, relay means will activate a buzzer, so as to be audible to the driver.

Another object of this invention is to provide an electronic circuit, which will employ relay means to close the circuit between the buzzer and the lights, so as to provide audible signal means to alert the driver that the lights are on, after the ignition switch is opened.

A further object of this invention is to provide an electronic circuit of the type described, which will employ a two-position switch, one contact portion thereof serving to bring the circuit to normal.

A still further object of this invention is to provide an electronic circuit of the type described, which will be of such construction, so as to enable anyone to quickly and easily install it in their vehicle.

Other objects of the invention are to provide a buzzer warning circuit for automobile lights, which is simple in design, inexpensive to manufacture, rugged in construction, easy to use and efficient in operation.

These and other objects will be readily evident, upon a study of the following specification, and the accompanying drawing, wherein, the drawing is schematic, and is the sole view of the invention.

According to this invention, circuit 10 includes the key operated ignition switch 11, of which one side is wired to one side of relay 12. The opposite side of relay 12 is electrically secured to ground 13. The relay contacts 14 are wired at one side to instrument panel lights or tail lights of the vehicle.

When the ignition switch 11 is turned to the on position, it will energize relay 12, which opens contacts 14 wired in series with the instrument panel lights or the tail lights of the automobile.

If the user leaves his or her lights on when they turn the ignition switch off, the relay contacts 14 close. The circuit 10 includes contacts 15 of the double-pole, double-throw switch 15a. The two position switch 15a should be turned to the on position. This causes contacts 15 to be closed, and is the normal position of the switch 15a. With contacts 15 closed, the buzzer 16 will be activated to produce an audible sound. Contacts 15 are wired in series with buzzer 16, and the opposite side of buzzer 16 is electrically secured to the ground 13 of the automobile.

Circuit 10 is such, that if a person wishes to leave his or her lights, or parking lights, on when leaving the automobile, they may turn the switch 15a to the off position, which opens contacts 15 of switch 15a, and closes contacts 17. When the ignition switch 11 is turned on the buzzer will sound to remind the user that the switch 15a is in the off position. When the user turns the switch 15a to the on position, this will open the contacts 17 and close contacts 15 and the buzzer 16 will no longer sound, this being the normal position of the switch 15a.

It shall be noted that new automobile systems, that have a buzzer therein, will not require the use of buzzer 16, as shown in the drawing.

While various changes may be made in the detail construction, it is understood that such changes will be within the spirit and scope of the present invention, as is defined by the appended claims.

What I claim is:

1. A warning circuit for an automotive headlamp circuit which is connected with and operated along with an instrument panel lighting circuit comprising a motor ignition switch operating an ignition circuit for said vehicle, a relay in series with said ignition circuit so as to be energized when the ignition circuit is energized, a normally closed electromagnetic switch in series with said instrument panel lighting circuit, said switch being opened by energizing said relay, an electrically energized audible warning device operatively connected to said normally closed electromagnetic switch and energized to emit a signal when said switch is in closed position and the instrument panel lighting circuit is energized, and a manually operable double pole, double throw switch having one pole in series with the normally closed electromagnetic switch and the other pole in a series circuit with the ignition circuit whereby in a first position the circuit through the electromagnetic switch to the audible warning device is closed and the series circuit from the ignition circuit to the warning device is open at said double pole, double throw switch and in a second position the series circuit from the ignition circuit to the warning device is closed and the circuit through the electromagnetic device to the audible warning device is open at said double pole, double throw switch.

2. A warning device as claimed in claim 1 wherein the audible warning device is a buzzer.

* * * * *